(12) United States Patent
Sayeedi

(10) Patent No.: US 7,099,294 B2
(45) Date of Patent: Aug. 29, 2006

(54) METHOD AND APPARATUS FOR EXCHANGING SOFTWARE INFORMATION IN A PACKET DATA COMMUNICATION SYSTEM

(75) Inventor: Shahab M. Sayeedi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 686 days.

(21) Appl. No.: 10/192,956

(22) Filed: Jul. 9, 2002

(65) Prior Publication Data

US 2003/0012155 A1   Jan. 16, 2003

Related U.S. Application Data

(60) Provisional application No. 60/305,006, filed on Jul. 12, 2001.

(51) Int. Cl.
*H04B 7/216* (2006.01)
(52) U.S. Cl. ..................................... 370/335
(58) Field of Classification Search ................ 370/328, 370/335, 465, 473; 455/433, 560; 702/122; 717/170, 173
See application file for complete search history.

(56) References Cited

U.S. PATENT DOCUMENTS 5,408,419 A * 4/1995 Wong ......................... 709/225

6,101,386 A   8/2000 Dettner

FOREIGN PATENT DOCUMENTS

| EP | 0 279 232 A2 | 8/1988 |
|---|---|---|
| WO | WO 93/21715 A1 | 10/1993 |
| WO | WO 98/35526 A2 | 8/1998 |
| WO | WO 00/02350 A1 | 1/2000 |
| WO | WO 02/098096 A2 | 12/2002 |

OTHER PUBLICATIONS

3GPP2, Interoperability Specification (IOS) for CDMA 2000 Access Network Interfaces—Part 6 (A8 and A9 Interfaces), pp. 1-88, Nov. 2001.*

* cited by examiner

*Primary Examiner*—Frank Duong
(74) *Attorney, Agent, or Firm*—Steven A. May

(57) ABSTRACT

In a packet data communication system, a first communication device and a second communication device, connected to each other by an A8/A9 interface, exchange software version information informing of the version of software that is stored in, and executed by, each communication device. The software version information is included in independent, self-contained software version messages and software version acknowledgment messages that may be exchanged at any time between the first communication device and the second communication device, such as during call set up or in response to a disruptive event.

6 Claims, 4 Drawing Sheets

| | | OCTETS |
|---|---|---|
| 301 — ⇒ A9 MESSAGE TYPE = [10H] | | 1 |
| 306 — ⇒ CORRELATION ID: A9 ELEMENT IDENTIFIER = [13H] | | 1 |
| 308 — LENGTH = [04H] | | 2 |
| 302 { 310 — (MSB) CORRELATION VALUE = <ANY VALUE> (LSB) | | 3 |
| | | 4 |
| | | 5 |
| | | 6 |
| 312 — ⇒ CAUSE: A9 ELEMENT IDENTIFIER = [04H] | | 1 |
| 314 — LENGTH = [01H] | | 2 |
| 303 { 316 — ext = [0] | CAUSE VALUE = 07H (OAM&P INTERVENTION) 20H (EQUIPMENT FAILURE) | 3 |
| 318 — ⇒ SOFTWARE VERSION: A9 ELEMENT IDENTIFIER = [31H] | | 1 |
| 320 — LENGTH = <VARIABLE> | | 2 |
| 322 — IOS MAJOR REVISION LEVEL (X) = [04H] | | 3 |
| IOS MINOR REVISION LEVEL (Y) = [02H] | | 4 |
| 304 { IOS POINT RELEASE LEVEL (Z) = [00H] | | 5 |
| 324 — MANUFACTURER/CARRIER SOFTWARE INFORMATION = <PRINTABLE ASCII CHARACTER> | | 6 |
| ... | | ... |
| 326 — MANUFACTURER/CARRIER SOFTWARE INFORMATION = <PRINTABLE ASCII CHARACTER> | | n |

300

FIG. 3

| | | OCTETS |
|---|---|---|
| 401 — ⇒ A9 MESSAGE TYPE = [10H] | | 1 |
| 406 — ⇒ CORRELATION ID: A9 ELEMENT IDENTIFIER = [13H] | | 1 |
| 408 — LENGTH = [04H] | | 2 |
| 410 — (MSB) | | 3 |
| CORRELATION VALUE = <ANY VALUE> | | 4 |
| | | 5 |
| (LSB) | | 6 |
| 412 — ⇒ SOFTWARE VERSION: A9 ELEMENT IDENTIFIER = [31H] | | 1 |
| 414 — LENGTH = <VARIABLE> | | 2 |
| 416 — IOS MAJOR REVISION LEVEL (X) = [04H] | | 3 |
| IOS MINOR REVISION LEVEL (Y) = [02H] | | 4 |
| IOS POINT RELEASE LEVEL (Z) = [00H] | | 5 |
| 418 — MANUFACTURER/CARRIER SOFTWARE INFORMATION = <PRINTABLE ASCII CHARACTER> | | 6 |
| ... | | ... |
| 420 — MANUFACTURER/CARRIER SOFTWARE INFORMATION = <PRINTABLE ASCII CHARACTER> | | n |

METHOD AND APPARATUS FOR EXCHANGING SOFTWARE INFORMATION IN A PACKET DATA COMMUNICATION SYSTEM

REFERENCE(S) TO RELATED APPLICATION(S)

The present application claims priority from provisional application, Ser. No. 60/305,006, entitled "METHOD AND APPARATUS FOR EXCHANGING SOFTWARE INFORMATION IN A PACKET DATA COMMUNICATION SYSTEM," filed Jul. 12, 2001, which is commonly owned and incorporated herein by reference in its entirety.

FIELD OF THE INVENTION

The present invention relates generally to cellular communication systems and, in particular, to data transmission protocols in a packet data communication system.

BACKGROUND OF THE INVENTION

The TIA/EIA (Telecommunications Industry Association/Electronic Industries Association) IS-2001, or IOS (3GPP2 A.S0001 Inter Operability Specification), standard provides a compatability standard for cellular mobile telecommunications systems that operate as a cdma2000, 1XEV-DO, 1XEV-DV, or any other technology supported by an A.S0001/IS-2001 based Access Network. The standard ensures that a mobile station (MS) operating in a cdma2000 system can obtain communication services when operating in a cellular communication system or personal communication system (PCS) manufactured according to the standard. To ensure compatibility, radio system parameters and call processing procedures are specified by the standard, including call processing steps that are executed by an MS and a base station serving the MS in order to establish a call and digital control messages and analog signals that are exchanged between elements of an infrastructure that includes the base station.

A typical cdma2000 communication system infrastructure includes a base station in communication with a Packet Control Function (PCF). An interface between the base station and the PCF includes an A9 interface that provides a signaling interface between the base station and the PCF and an A8 interface that provides a bearer path between the base station and the PCF. These interfaces are collectively known in the IS-2001, or IOS, standard as the Aquinter reference point or A8/A9 interface.

The evolution of the IOS standard has resulted in the existence of multiple versions of the standard. As the standard has evolved, later versions of the standard support functions and provide signaling that is not included in earlier versions of the standard. A possible outcome of the co-existence of multiple versions of the standard is that a base station and a PCF that are communicating over the A8/A9 interface may each conform to a different version of the IOS standard. The entity running software conforming to the higher level version of the standard may then expect the entity running software conforming to the lower level version of the standard to support functions that the latter entity is not capable of supporting. The possible results include miscommunication between the two entities, wasted communication resources as one entity awaits responses that are not forthcoming or communicates with applications that are not supported by the other entity, and dropped telephone calls.

Furthermore, if a disruptive event occurs at either the base station or the PCF as a result of a hardware or a software failure, resulting in an entity reset, the resources allocated for supporting packet data communications remain allocated. For example, if a PCF resets, air interface traffic channel resources at base stations associated with the resetting PCF remain allocated by the base stations even though the communications supported by the packet data resources are terminated. Again this results in wasted communication resources.

Therefore a need exists for a method and an apparatus for allowing software version information to be exchanged between a base station and a PCF and for facilitating a release of communication resources in the event of a failure at either the base station or the PCF.

BRIEF DESCRIPTION OF THE DRAWINGS

FIG. 3 is a block diagram of a software version message in accordance with an embodiment of the present invention FIG. 4 is a block diagram of a software version acknowledgment message in accordance with an embodiment of the present invention

DETAILED DESCRIPTION OF THE INVENTION

To address the need for a method and an apparatus for allowing software version information to be exchanged between a base station and a packet control function (PCF) and for facilitating a release of communication resources in the event of a failure at either the base station or the PCF, a packet data communication system includes a first communication device and a second communication device, connected to each other by an A8/A9 interface, that exchange software version information informing of the version of software that is stored in, and executed by, each communication device. The software version information is included in independent, self-contained software version messages and software version acknowledgment messages that may be exchanged at any time between the first communication device and the second communication device, such as during call set up or in response to a disruptive event.

Generally, an embodiment of the present invention encompasses a method for exchanging software information over an A8/A9 interface in a packet data communication system. The method includes steps of transmitting, by a first communication device, a first set of software version information informing of a version of software stored in the first communication device, and in response to the transmission of the first set of software version information, receiving, by the first communication device, a second set of software version information informing of a version of software stored in a second communication device.

Another embodiment of the present invention encompasses a method for exchanging software information over an A8/A9 interface in a packet data communication system. The method includes steps of receiving, by a first communication device, a first set of software version information informing of a version of software stored in a second communication device, and in response to receiving the first set of software version information transmitting by the first communication device a second set of software version information informing of a version of software stored in the first communication device.

Still another embodiment of the present invention encompasses a communication device capable of operating in a packet data communication system. The communication device includes a memory that stores software and a processor that assembles a message that includes software version information, wherein the software version information informs of a version of software stored in the memory and wherein the communication device transmits the message over an A8/A9 interface.

Figure 1:
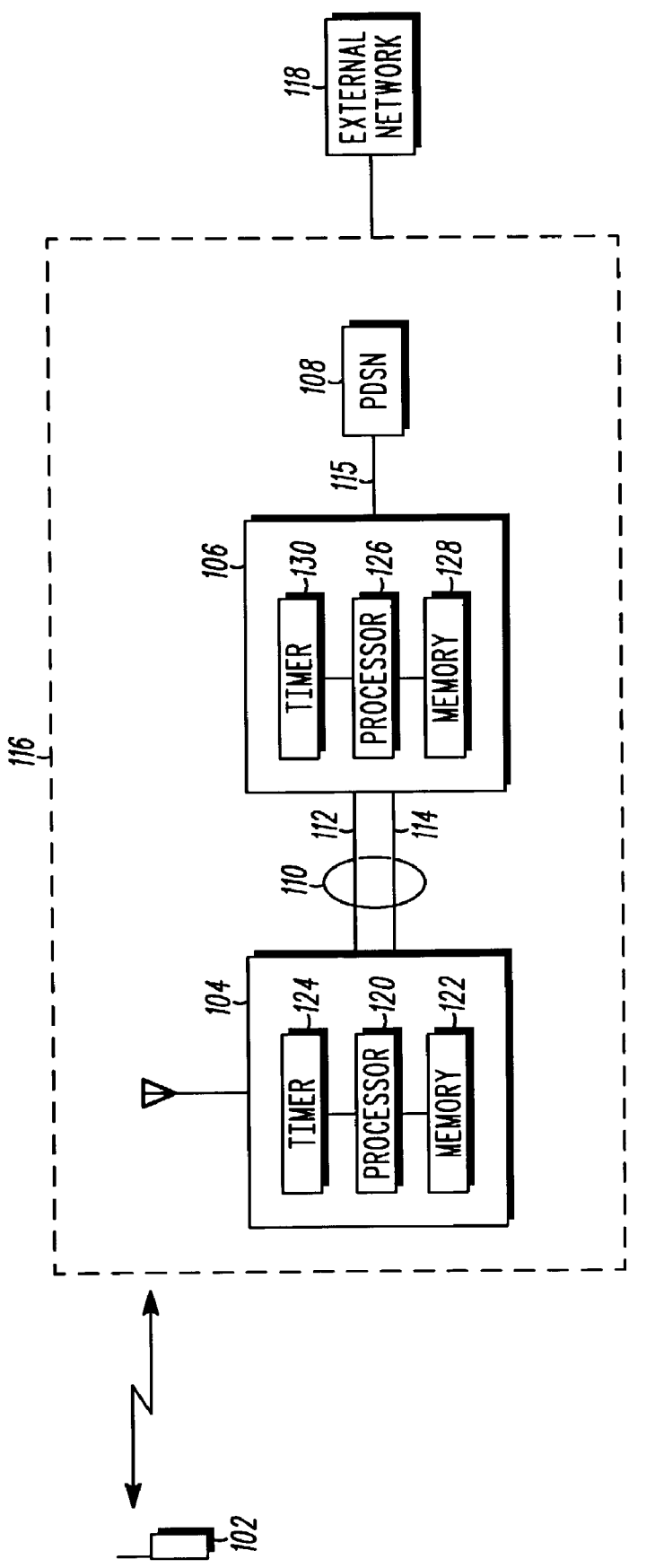
FIG. 1 is a block diagram of a wireless communication system 100 in accordance with an embodiment of the present invention.

The present invention may be more fully described with reference to FIGS. 1–4. FIG. 1 is a block diagram of a wireless communication system 100 in accordance with an embodiment of the present invention. Communication system 100 includes at least one mobile station (MS) 102 and a base station 104 that provides communications services to the MS. Base station 104 is in communication with a Packet Control Function (PCF) 106, which is in turn in communication with a Packet Data Service Node (PDSN) 108. Base station 104, PCF 106, and PDSN 108 are collectively referred to herein as a telecommunications infrastructure 116. Base station 104 and PCF 106 communicate with each other via an Aquinter reference point, or A8/A9 interface, 110 that includes an A8 interface 112 that provides a bearer path between the base station and the PCF and an A9 signaling interface 114. PCF 106 and PDSN 108 communicate with each other via an A10/A11 interface 115. Each of base station 104 and PCF 106 includes a respective processor 120, 126, such as a microprocessor or digital signal processor (DSP), and an associated memory 122, 128 that stores software, such as programs, applications, and operating protocols, that are executed by the processor and permits the functioning of the base station and the PCF. Each of processors 120 and 126 is also coupled to a respective timer 124, 130.

Communication system 100 comprises a wireless packet data communication system. In order for MS 102 to establish a packet data connection with an external network 118 connected to infrastructure 116, base station 104, PCF 106, and PDSN 108 operate in accordance with well-known wireless telecommunications protocols. By operating in accordance with well-known protocols, a user of MS 102 can be assured that MS 102 will be able to communicate with infrastructure 116 and establish a packet data communication link with external network 118 via the infrastructure. Preferably, communication system 100 operates in accordance with the 3GPP2 and TIA/EIA (Telecommunications Industry Association/Electronic Industries Association) A.S0001/IS-2001, or IOS (Inter Operability Specification), standard, which provides a comparability standard for IS-2000, that is, cdma2000 or 1xEV-DO, systems, and infrastructure 116 is an A.S0001/IS-2001 access network. The standard specifies wireless telecommunications system operating protocols, including radio system parameters and call processing procedures. However, those who are of ordinary skill in the art realize that communication system 100 may operate in accordance with any one of a variety of wireless packet data communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

In communication system 100, each of base station 104 and PCF 106 informs the other of the version of software stored in, and/or executed by, the entity by an exchange of software version information via the A8/A9 interface. The software version information is included in independent, self-contained software version messages and software version acknowledgment messages that base station 104 and PCF 106 may exchange at any time, such as during call set up or in response to a disruptive event, such as a hardware or software failure in one of the entities that results in a reset or a shut down of the entity.

Figure 2:
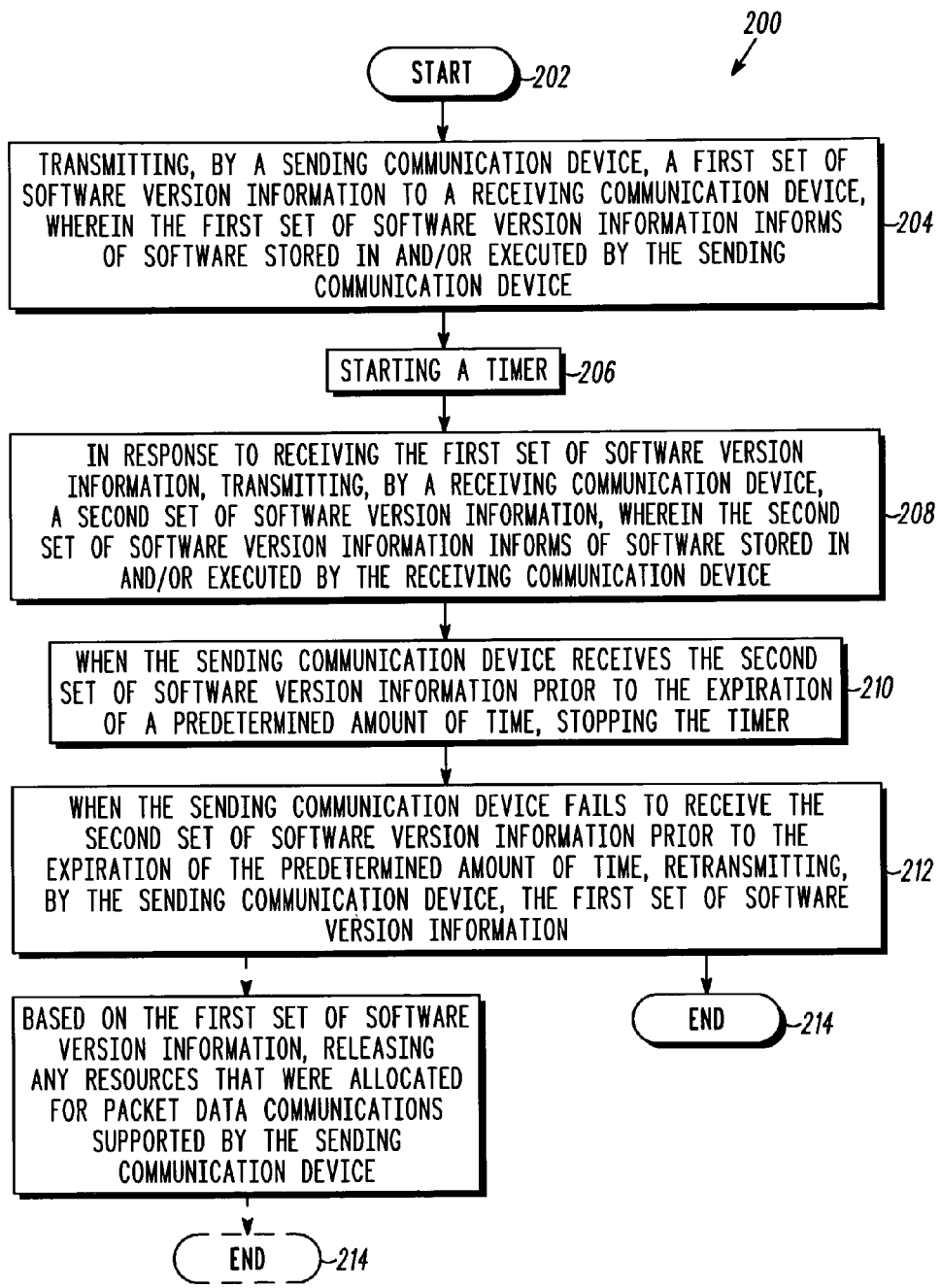
FIG. 2 is a logic flow diagram of the steps executed by a sending communication device and a receiving communication device in exchanging software version information in accordance with an embodiment of the present invention.

FIG. 2 is a logic flow diagram 200 of the steps executed by a sending communication device and a receiving communication device in exchanging software version information in accordance with an embodiment of the present invention. Logic flow diagram 200 begins (202) when a sending communication device (e.g., base station 104) transmits (204) a first set of software version information to a receiving communication device (e.g., PCF 106) via A9 interface 114. For the purpose of illustrating the principles of the present invention, base station 104 is referred to herein as the sending communication device and PCF 106 is referred to as the receiving communication device. However those who are of ordinary skill in the art realize that each of base station 104 and PCF 106 is capable of functioning as a software version message sending communication device or a software version message receiving communication device.

The first set of software version information is included in an independent, self-contained software version message (an A9 version information message) that can transmitted between base station 104 and PCF 106 at any time, such as during call set up or in response to a failure of the hardware or the software of the base station or the PCF. The first set of software version information informs of a version of software stored in and/or executed by sending communication device 104. When sending communication device 104 transmits the first set of software version information, the sending communication device, preferably processor 120 of the sending communication device, starts (206) a timer 126.

In response to receiving the first set of software version information, receiving communication device 106 transmits (208) a second set of software version information that informs of a version of software stored in and/or executed by the receiving communication device. In one embodiment of the present invention, the second set of software version information is included in an independent, self-contained software version acknowledgment message (an A9 version information acknowledgment message) that can be transmitted between base station 104 and PCF 106 at any time.

When sending communication device 104 receives the second set of software version information, the sending communication device 104 stops (210) timer 126. When the sending communication device 104 fails to receive the second set of software version information prior to the expiration of a predetermined amount of time, preferably anywhere in a range from zero seconds to five seconds, the sending communication device retransmits (212) the first set of software version information and resets the timer. Upon sending communication device 104 receiving the second set of software version information, the logic flow ends (214). When either sending communication device 104 or receiving communication device 106 receives a responsive set of software version information, such as a software version acknowledgment message without having first transmit a first set of software version information, the communication device ignores the responsive set of software version information.

In another embodiment of the present invention, wherein the software version information is included in a software version message, base station 104 and PCF 106 inform each other of the version of software that they are executing in response to a failure of the hardware or the software of the base station or the PCF. The same exchange of signals is followed as is depicted in FIG. 2, except for an inclusion of an additional step, that is, step 216. In step 216, upon receiving the software version message, which includes information concerning the failure in a 'Cause' data field that is included in the message, the receiving communication device may release any resources that were allocated for packet data communications supported by the sending communication device.

For example, when base station 104 resets, the base station transmits a software version message to PCF 106. Included in the software version message is information, in the Cause data field, informing PCF 106 of the reset. In response to receiving the first set of software version information, PCF 106 releases any A8 resources (and may initiate release of A10 (PCF to PDSN bearer channel) and PPP (point-to-point) resources) previously allocated for packet communications via base station 104. By way of another example, when PCF 106 resets, the PCF transmits a software version message to base station 104, which message includes information in the Cause data field informing the base station of the reset. In response to receiving the software version message, base station 104 may release any over-the-air interfaces that were previously allocated for packet data calls supported by PCF 106.

FIG. 3 is a block diagram of an independent, self-contained software version message 300 in accordance with an embodiment of the present invention. Software version message 300 is compiled by a processor 120, 126 of the sending communication device and is based on the software stored in a respective memory 122, 128 of the sending communication device. Software version message 300 is preferably sub-divided into four data fields, or elements, that is, a Software Version Message, or A9 Message, Type data field 301, a Correlation data field 302, a Cause data field 303, and a Software Version data field 304. However, in another embodiment of the present invention the software version message does not include Cause data field 303 and does not indicate the reason for the transmission of the software version message or provide information supporting the release of allocated resources.

Software Version Message Type data field 301 identifies message 300 as a software version message and preferably includes a one byte software version message identifier. Correlation data field 302 of message 300 is used to associate a software version message with the message's corresponding software version acknowledgment message. For example, a PCF may be coupled to multiple base stations. When the PCF such as PCF 106, resets it sends out multiple software version messages. Inclusion of a Correlation data field, or element, in each of the software version message and the software version acknowledgment message allows PCF 106 to tie a subsequently received software version acknowledgment message to the corresponding software version message that was sent by the PCF. Preferably, Correlation data field 302 includes a one byte correlation identifier 306 that identifies data field, or element, 302 as a Correlation data field, a one byte correlation data field length value 308 that corresponds to a length, or size, of Correlation data field 302, and a unique four byte correlation value 310 that is used by the sending communication device to correlate, or associate, the sent software version message with a subsequently received software version acknowledgment message.

Cause data field 303 of message 300 identifies the reason for the sending of the software version message, such as a reset by the sending communication device, or an OAM&P (Operation, Administration, Maintenance, and Performance) intervention (i.e., a deliberate intervention, such as when an operator takes down an entity for a software upgrade). Cause data field 303 preferably includes a one byte cause identifier 312 that identifies data field, or element, 303 as a Cause data field, a one byte cause data field length value 314 that corresponds to a length, or size, of Cause data field 303, and a cause value 316 that identifies the reason for the sending of the software version message.

Software Version data field 304 of message 300 includes information concerning the version of the software running on the sending communication device and may further include manufacturer and carrier software-related information. For example, Section 4.2.0 of the 3GPP2 A.S0001 or EIA/TIA IS-2001-B specification describes information that may be included in this data field. Software Version data field 304 preferably includes a one byte Software Version data field identifier 318 that identifies data field 304 as a Software Version data field, a one byte data field length value 320 that corresponds to a length, or size, of Software Version data field 304, a software version identifier 322 identifying the software version stored in and/or executed by the sending communication device, and one or more data fields 324, 326 (two shown) that include manufacturer and carrier software information, such as miscellaneous information that the carrier may wish to exchanges between different system components. In a system, such as communication system 100, operating under the IOS, or IS-2001/A.S0001, standard, software version identifier 322 preferably includes a one byte identifier of the IOS major revision level, a one byte identifier of the IOS minor revision level, and a one byte identifier of the IOS point release level.

FIG. 4 is a block diagram of an independent, self-contained software version acknowledgment message 400 in accordance with an embodiment of the present invention. Software version acknowledgment message 400 is compiled by a processor 120, 126 of the receiving communication device and is based on the software stored in a respective memory 122, 128 of the receiving communication device.

Software version acknowledgment message 400 is preferably sub-divided into three data fields, or elements, that is, a Software Version Message, or A9 Message, Type data field 401, a Correlation data field 402, and a Software Version data field 403. Software Version Message Type data field 401 of message 400 identifies message 400 as a software version acknowledgment message and preferably includes a one byte software version acknowledgment message identifier. Correlation data field, or element, 402 of message 400 is used to associate the software version acknowledgment message with a corresponding software version message. Preferably, Correlation data field 402 includes a one byte correlation identifier 406 that identifies data field, or element, 402 as a Correlation data field, a one byte correlation data field length value 408 that corresponds to a length, or size, of Correlation data field 402, and a unique four byte correlation value 410 that is used to associate the software version acknowledgment message with a corresponding software version message.

Software Version data field 403 of message 400 includes information concerning the version of the software running on the receiving communication device and manufacturer and carrier software-related information. Once again, Section 4.2.0 of the 3GPP2 A.S0001 or the EIA/TIA/IS-2001-B specification describes information that may be included in this data field. Software Version data field 403 preferably includes a one byte Software Version data field identifier 412 that identifies data field 403 as a Software Version data field, a one byte data field length value 414 that corresponds to a length, or size, of Software Version data field 403, a software version identifier 416 identifying the software version stored in and/or executed by the receiving communication device, and one or more data fields 418, 420 (two shown) that include manufacturer and carrier software information. In a system operating under the IOS, or A.S0001/IS-2001, standard, software version identifier 416 preferably includes a one byte identifier of the IOS major revision level, a one byte identifier of the IOS minor revision level, and a one byte identifier of the IOS point release level.

By exchanging software version information, base station 104 and PCF 106 are able to communicate to each other, via the A8/A9 interface, the version of software that is stored in, and executed by, each communication device. In one embodiment of the present invention, the software version information may be included in independent, self-contained software version messages and software version acknowledgment messages that may be exchanged at any time between base station 104 and PCF 106, such as during call set up or in response to a disruptive event, such as a shut down or a reset, involving either the base station or the PCF. By exchanging software version information, base station 104 and PCF 106 are able to avoid the miscommunications and resource allocation inefficiencies that may result from one of the two entities unknowingly executing a software version that is different from the version executed by the other entity. Furthermore, the exchange of software version messages and software version acknowledgment messages conserves system resources by facilitating a release of communication resources in the event of a failure at either the base station or the PCF.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for an intra-access network exchange of software information over an A9 interface in a packet data communication system comprising steps of:

transmitting, by a first communication device, an A9 message that includes software version information informing of a version of software in use at the first communication device, the message comprising a Message Type data field, a Correlation data field, a Software Version data field, and a Cause data field that comprises an indication of the reason for the transmission of the message;

releasing, by a second communication device and based on the indication, resources that were allocated for packet data communications supported by the first communication device; and wherein one communication device of the first and second communication devices is a base station and the other communication device of the first and second communication devices is a Packet Control Function.

2. The method of claim 1, wherein the packet data communication system is an IS-2001 based Radio Access Network system.

3. A method for exchanging software information over an A9 interface in a packet data communication system comprising steps of:

receiving, by a communication device, an A9 message that includes software version information informing of a version of software in use at a second communication device, the message comprising a Message Type data field a Correlation data field, a Software Version data field, and a Cause data field that comprises an indication of the reason for the transmission of the message;

releasing, by the communication device and based on the indication, resources that were allocated for packet data communications supported by the communication device; and wherein the communication device comprises one of a base station and a packet control function.

4. The method of claim 3, wherein the packet data communication system is an IS-2001 based Access Network system.

5. A communication device capable of operating in a wireless access network, the communication device comprising:

a memory that stores software;

a processor that receives an A9 message via an A9 interface, wherein the message includes software version information that informs of a version of software stored in the memory and comprises a Message Type data field, a Correlation data field, a Software Version data field, and a Cause data field that comprises an indication of the reason for the transmission of the message, and based on the indication, releases resources that were allocated for packet data communications supported by the communication device.

6. The communication device of claim 5, wherein the communication device comprises one of a base station and a packet control function.

* * * * *